Jan. 16, 1940.  C. MacKINNON  2,186,981
DEVICE FOR STABILIZING BINDER TWINE SUPPLY TO HARVESTING MECHANISM
Filed Jan. 30, 1936
Fig. 1.
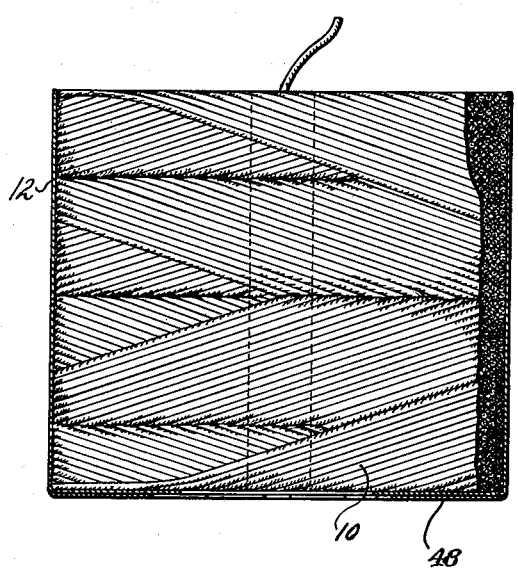
Fig. 2.
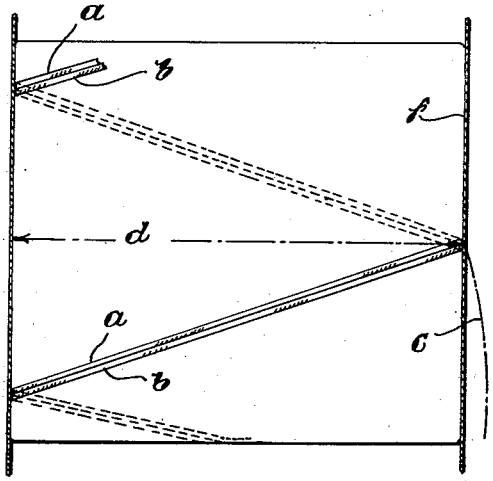
Fig. 4.
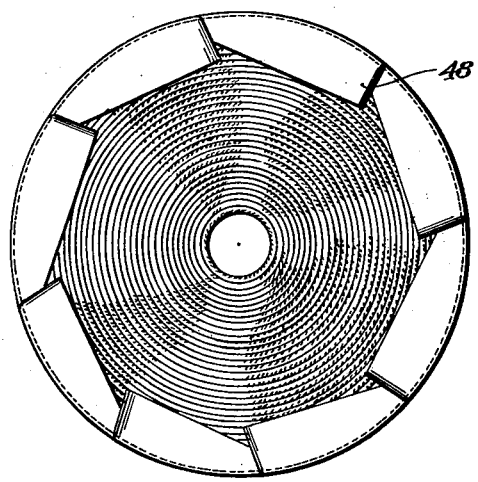
Fig. 3.
Inventor
Charles MacKinnon
by Everett E. Kent
Attorney Patented Jan. 16, 1940

2,186,981

UNITED STATES PATENT OFFICE 2,186,981

DEVICE FOR STABILIZING BINDER TWINE SUPPLY TO HARVESTING MECHANISM

Charles MacKinnon, North Plymouth, Mass., assignor to Plymouth Cordage Company, Plymouth, Mass., a corporation of Massachusetts Application January 30, 1936, Serial No. 61,504

1 Claim. (Cl. 242—146)

This invention relates to improvements in devices for stabilizing binder twine supply to harvesting mechanism.

The purpose of the appliance is to prevent that snarling of twine which sometimes occurs within the twine-can. The particular article known as "binder twine" is made of hard vegetable fibre, such as manila, sisal and the like. This is stiff, rough and coarse, about a tenth of an inch in diameter, with end portions of fibres everywhere projecting loosely. The balls to which the invention relates are six to eight inches in diameter and, for delivering their twine, stand with axes upright, being seven inches or so high. Ordinarily the twine-can on a harvesting machine holds two balls, one resting on top of the other where it is loosely stationary, except for being jolted about as the harvesting machine travels over rough ground; and the upper ball, which is first to serve as the supply, has its outer end tied to the leading end of the under ball, so that when it is exhausted supply will continue from the under ball without interruption. As the drawing of twine from the inside of a ball proceeds, the supply in that ball remains stable, as to the position of each convolution relative to the other convolutions, until the residue of ball has so far diminished as to have become a thin cylinder of twine, consisting of what was originally its outmost layer of convolutions. The structure is then so frail that some or all of the remaining convolutions often fall from their distributive formation in which they extend as a hollow cylinder up the height of the ball, and collapse into a ring formation at the bottom of the ball, or even lapping down more or less around the under ball. At this time there is danger of the occurrence of snarls in the twine, which may cause annoying and expensive loss of labor and time.

Prior attempts to avoid this evil have made the balls with devices for upholding the outer convolutions, as by pins or friction devices projecting into the ball or toward its axis from surrounding wrapping, or by ridges of cardboard pulp molded inward into such spaces as exist between neighboring convolutions of twine, thus to provide shelves which underlie each individual exterior convolution of twine in the ball, and so to uphold each against gravity. The resorting to any of these measures introduces costs and other problems which are objectionable, as well as sometimes affecting adversely the drawing of the twine.

By contrast, the present invention leaves the convolutions in their natural freedom; without a shelf or support of pulp, pins or other foreign matter for grasping or underlying them, or holding them by friction. Instead, to prevent falling of twine, the invention provides a smooth vertical wall of paper which acts as a cylindrical side abutment barring twine from moving to a greater distance from the vertical axis.

This smooth-walled cylinder has a completely open top end. At its lower end a little of the paper is folded annularly toward the axis, making a horizontal partial bottom, with large central opening. The structure is a sort of annular cup, whose open top and large bottom opening permit free draft of twine from an underneath ball, after its own contents have become exhausted. As the upper ball approaches exhaustion the paper partial bottom constitutes a peripheral base to hold up the residual shell, of such convolutions as remain, from settling down around the lower ball and so producing a troublesome situation, of which there is danger when the residuum of a large upper ball is jolted about on top of a smaller lower ball. The breadth of this annular horizontal base is sufficient to maintain the vertical wall on top of the lower ball, while the said retaining effect of the vertical wall holds the ultimate few convolutions of twine up in their original places, even though vertical gaps exist between those convolutions.

The invention finds its principal utility in binder twine balls wound in the helical manner known as the "compact" or "universal" style of winding. One characteristic of this is the long pitch, such that in any layer, a number of other convolution threads lie between the beginning and end of any particular single complete convolution. The basis of the invention lies in the perception that, in general, each convolution is pronouncedly oblique to the axis of the ball; that the length of that convolution is substantially greater than is the circumference of a cylinder or circle having the same diameter as the diameter of the helix in which that convolution lies; and that, if that convolution were to fall into a circle or ring, as the convolutions do when a general collapse occurs, that circle would have a larger diameter than the diameter of the helix in which that convolution is standing in the ball. The present invention operates by preventing the convolution from enlarging its diameter. It provides a lateral barrier against outward radial movement of any part of any convolution. This barrier is substantially cylindrical; and, while it need not touch the twine, it should preferably be close enough to the outside of the twine-ball so that, having regard to the thickness of the twine, it prevents any convolution thereof from expanding enough to get down past the convolution next below it.

I have demonstrated by test that the modicum of stiffness and of resilience possessed by binder twine is sufficient to urge each part of the twine radially outward, in the ball, so that it does not fall inward; and so that the appliance of the invention can prevent collapse, without providing either frictional or mechanical under supports for the convolutions, when the ball has its axis vertical, by operating as a lateral or radial outside barrier. Many advantages flow from this discovery and from the appliance now conceived for putting it to practical use.

When twine is being drawn upward from within a ball standing with its axis upright, which is the usual arrangement in the twine-can of a harvesting machine, the modicum of resilient stiffness possessed by the twine, thus coiled, tends to keep it against its exterior wall. At any stage of draft the convolution which is next to be drawn tends to remain in position, until it finds that there is insufficient outside radial support. The length of twine which is in any oblique convolution is too great to fall through the circular bore of the cylinder, left by withdrawal of previous convolutions; and that part of the ball which remains provides the outside radial barrier which prevents that length of twine from forming itself into a circle, as it must do if it is to fall into collapse into a ring at the bottom. The external convolutions of the ball, however, do not have an outside barrier to radial expansion. The appliance of the invention supplies an outside radial barrier which is not a part of the ball, but which inhibits outward movement of each external convolution.

In the accompanying drawing:

Figure 1 is an elevation of a "compact" or "universal" wound ball of binder twine having a stabilizer embodying features of the invention permanently associated therewith, the stabilizer being wholly in vertical section parallel to the axis of the ball, and a fragment of the ball being represented in similar medial section;

Figure 2 is a diagram representing a ball as in Figure 1, but showing the principle of operation of the stabilizer;

Figure 3 is an illustration of a fragment showing diagrammatically the stabilizer serving as a mere exterior barrier for preventing outward movement of any convolution; and Figure 4 is a bottom plan view of the ball with permanent stabilizer, whose elevation is seen in Figure 1.

The drawing illustrates a stabilizing cylinder 12 made by wrapping a smooth stiff sheet of paper closely around a cylindrical ball of binder twine 10. The ball is wound in the style known as "compact" or "universal". In the winding of the twine into balls, the winding may be stopped at any approximation of the diametric size desired, and notwithstanding variations of size the stabilizer will be effective. This both serves the convenience of the operator who is making the twine ball; and at the same time it relieves the operator of the harvesting machine, in which subsequently the ball is to be used, of the task of adjusting a stabilizer upon each ball when he is about to use the ball. The wrapped smooth sheet of paper being devoid of projections, the cylinder made thereby is equally devoid of inward projection for engaging and supporting the convolutions. Its principle of operation is that it stands so close to the crests of the exterior convolutions of twine that it affords a horizontal barrier to movement of any part of any convolution further away from the axis of the ball. The convolution therefore is barred from executing a movement which is a necessary preliminary to a collapsing fall, and yet the interior face, supporting the twine, is smooth for free run of twine. A thickness of paper for the stabilizer of .016 inch has been found satisfactory, the paper being inexpensive cardboard of a variety known as chip boad. The wrapped bands may be overlapping and stuck together; and the paper is represented as being in-folded at one end of the cylindrical ball, to make a flange 48 which prevents a cylinder from becoming displaced on the cylindrical ball during handling, and also affords a base by which an upper ball, when nearly consumed, can be stable while standing loose in the twine can on top of the under ball, in the harvester machine.

Supposing a residue of ball to be thus enclosed, no convolution of it can fall; because, in order to fall, any convolution must assume a form which would have a shorter pitch of helix than its normal, and a consequent enlarged diameter of helix over its normal. Or, assuming that a convolution is to fall into circular form, the diameter of its circle would have to be considerably larger than the outside diameter of the ball,—which the barrier forbids. This will be apparent from the somewhat diagrammatic showing of Figure 2, wherein the normal positions of two adjoining exterior convolutions are portrayed at $a$ and $b$, and it is clear that the length of each convolution is greater than the circumference of a circle having the same diameter $d$ as their helix. Considering any such convolution, as here seen projected on a vertical plane, its lowest part is supported by its continuity into the residue of the ball, and its highest parts stand obliquely against a vertical wall, and cannot fall. The case is comparable to that of a ladder against a wall. The dot and dash line $c$ indicates the path through which any such upper portion of convolution $a$ would have to travel if it were to fall; and shows how the simple lateral barrier of the invention prevents that falling which is the initiation of a collapse. Since all portions of convolution $a$ are thus restrained, against movement to a greater distance from the axis of the ball, by the circumferential barrier $f$, it is obvious that this convolution $a$, which is typical of other exterior convolutions of the ball, cannot fall. By contrast, when a twine-ball is put into an ordinary twine-can, the ample size of the can, which is always made to have a marginal space around the largest of variant balls, would permit a stack of external convolutions to fall freely from its normal columnar arrangement, when the interior convolutions are gone.

I claim as my invention:

A binder twine stabilizing device, for a ball of binder twine which is normally to be used when standing loose with its axis vertical, in a can in a harvesting machine, said ball being a cylindrical coreless central-draft mass of coarse hard fibre twine compactly wound with helical convolutions of steep pitch; said device comprising a cylindrical sheet of paper closely enwrapping the ball of twine, having its interior surface smoothly free from projections and from frictional or adhesive devices by which it would support the twine in vertical axial direction; said sheet being a barrier acting only sidewise for holding residual undrawn twine convolutions in their mutual relations as originally laid, being a cylindrical paper cup, having its top open, and having a peripheral horizontal bottom folded in and extending perpendicular to the axis and leaving a large central bottom opening; the annular width of said bottom being sufficient to overlie a ball of smaller diameter, and so to support thereon the vertical part of the sheet if that vertical part is of larger diameter than the under ball; the whole combining to maintain the ultimate external convolutions of the upper ball in their original positions relative to each other and relative to the under ball.

CHARLES MacKINNON.